United States Patent [19]

Van Den Enden et al.

[11] Patent Number: 6,115,340

[45] Date of Patent: *Sep. 5, 2000

[54] MODIFYING THE RECORDING PROCESS TO EXTEND THE LIFE OF A REWRITABLE INFORMATION CARRIER

[75] Inventors: Gijsbert J. Van Den Enden; Johannes H. M. Spruit; Johan P. W. B. Duchateau; Johannes H. G. Jaegers, all of Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/800,633

[22] Filed: Feb. 14, 1997

[30] Foreign Application Priority Data

Feb. 16, 1996 [EP] European Pat. Off. ............. 96200388
Apr. 26, 1996 [EP] European Pat. Off. ............. 96201140
May 24, 1996 [EP] European Pat. Off. ............. 96201448

[51] Int. Cl.$^7$ ............................................. G11B 7/00
[52] U.S. Cl. ................................. 369/59; 369/275.3
[58] Field of Search ................................. 369/58, 54, 48, 369/47, 32, 44.27, 44.28, 275.3, 275.2, 59

[56] References Cited

U.S. PATENT DOCUMENTS

| | | | |
|---|---|---|---|
| 5,138,599 | 8/1992 | Fukushima et al. | 369/275.3 |
| 5,216,657 | 6/1993 | Nishiuchi et al. | 369/59 |
| 5,343,455 | 8/1994 | Takeuchi et al. | 369/59 |
| 5,388,105 | 2/1995 | Takagi et al. | 369/44.32 |
| 5,404,357 | 4/1995 | Ito et al. | 369/44.27 |
| 5,434,991 | 7/1995 | Maeda et al. | 369/32 |
| 5,528,569 | 6/1996 | Fujii et al. | 369/275.3 |
| 5,552,896 | 9/1996 | Yoshida | 369/275.3 |
| 5,570,339 | 10/1996 | Nagano | 369/275.3 |
| 5,608,704 | 3/1997 | Kim | 369/54 |
| 5,878,021 | 7/1996 | Miyauchi et al. | 369/275.3 |

FOREIGN PATENT DOCUMENTS

| | | |
|---|---|---|
| 0397238A1 | 11/1990 | European Pat. Off. . |
| 0594132A2 | 4/1994 | European Pat. Off. . |
| 718831 | 6/1996 | European Pat. Off. ................. 369/59 |
| WO9522802 | 8/1995 | WIPO . |

OTHER PUBLICATIONS

"Principles of Optical Disc Systems", G. Bouwhuis, J. Braat, A. Huijser, J. Pasman, G. Van Rosmalen, K. Schouhamer Immink, ISBN 0–85274–785–3, Adam Hilger Ltd. 1985.

Primary Examiner—Nabil Hindi

[57] ABSTRACT

The device according to the invention is suitable for recording a rewritable information carrier such a CD-E covered by a phase-change recording layer. As is known, such an information carrier has a limited useful life because the recorded, optically readable patterns start deviating ever more from the desired form when recorded recurrently. The invention is also based on the recognition that this degradation is accelerated if a certain part of the track on the information carrier constantly accommnodates the same patterns, for example, if information blocks are recorded starting from fixed initial positions and the information is represented by the patterns in a specific manner. The device comprises means for shifting the initial position along the track over a distance randomly selected within predefined boundaries and/or for adapting the manner of representation. This causes constantly different patterns to be recorded, even if the same information is to be recorded in a specific part of the track. The information carrier described according to the invention has an additional margin between the information blocks to allow of the shifting of the initial position.

23 Claims, 4 Drawing Sheets

MODIFYING THE RECORDING PROCESS TO EXTEND THE LIFE OF A REWRITABLE INFORMATION CARRIER

BACKGROUND OF THE INVENTION

1 Field of the Invention

The invention relates to a device for recording an information carrier of a rewritable type, the information carrier comprising a track and the device comprising recording means for recording an information block in a part of the track from an initial position, the information block representing information in a predefined manner.

The invention further relates to a method of recording an information carrier of a rewritable type, the information carrier comprising a track, and an information block being recorded in a part of the track from an initial position, the information block representing information in a predefined manner.

The invention also relates to an information carrier of a rewritable type recorded in accordance with the method.

The invention also relates to a device for reading an information carrier of a rewritable type recorded in accordance with the method, the device comprising reading means for reading and decoding the information blocks.

2. Description of the Related Art

Such an arrangement, method and information carrier are known from U.S. Pat. No. 5,388,105. The device disclosed therein is suitable for an information carrier of an optically rewritable and readable type, such as, for example, a Compact Disc Erasable (CD-E), which has a rewritable layer of phase-change material. Such information carrier has a preformed track, a so-called pregroove. The pregroove comprises address information and is intended for positioning a write head during the recording process for recording in a track optically readable patterns which represent information. The information is contained in blocks which are recorded in specific parts of the track, so-called sectors, from an initial position depending on the address information. The information is then represented in a certain manner by the optically readable patterns which form the block. This representation includes, for example, a sector identification (ID), a synchronization zone, a data block and error detection and correction data, which information is contained in the data block under a specific coding. A problem with the known device is that the optically readable patterns start differing from the desired form when the information carrier is recorded recurrently, so that the reading quality is degraded. This reduces the useful life of an information carrier.

It is an object of the invention to provide a device in which the deviations of the patterns are counteracted.

SUMMARY OF THE INVENTION

For this purpose, the device according to the invention is characterized in that the recording means are arranged for substantially shifting the initial position along the track over a randomly selected distance within predefined boundaries and/or for adapting the manner of representation. The invention is also based on the recognition that the deviation of the patterns formed in recurrent recording strongly depends on the correlation between blocks recorded on the same part of the track, the recording of the same or very similar blocks considerably accelerating the pattern degradation. A small shift of the patterns, such as a few (2 to 3) times the longest written mark used in therein was expected to be sufficient. Surprisingly, however, such a small shift, e.g. of around 32 channelbits, proved insufficient, while a substantial shift, e.g. of at least around 128 bits, was found to be effective.

For this purpose, a method according to the invention is characterized in that the initial position is substantially shifted along the track over a distance arbitrarily chosen within predefined boundaries and/or the manner of representation is adapted.

An information carrier according to the invention is recorded in accordance with said method.

A reading device according to the invention is characterized in that the reading means are arranged for reading the information blocks from positions substantially shifted over a distance arbitrarily chosen within predefined boundaries. Also, or alternatively decoding the information blocks is carried out in accordance with the adapted manner of representation of the information therein.

As a result of the aforesaid measures according to the invention, constantly varying patterns will be recorded on every part of the track, thus counteracting the accelerated degradation. An advantageous effect of this is the lengthening of the useful life of the information carrier. This advantageous effect particularly occurs when customary file management systems are used that rewrite file management information always on the same parts of the track.

An embodiment for the device according to the invention is characterized in that the manner of representation of the recorded information may be recovered from the information block itself when read out. This is advantageous in that the recovery of the information from a read information block is independent of information about the manner of representation stored elsewhere.

A further embodiment for the device according to the invention is characterized in that the manner of representation of the recorded information comprises scrambling with a scramble key which scramble key is included in the information block. This is advantageous in that any correlation between information blocks to be recorded on the same location is reduced with scrambling.

A further embodiment for the device according to the invention is characterized in that the manner of representation of the recorded information comprises including a variable amount of dummy data in the information block, which dummy data is recognizable when read out. The advantage of this is that by recurrently adding a variable amount of dummy data, possibly similar equal patterns in an information block will be recorded each time at different positions. If the of dummy data is added prior to the information in an information block, old information blocks will be largely overwritten and so invalid portions will not continue to be readable.

A further embodiment for the device according to the invention is characterized in that the manner of representation if the recorded information comprises including a first variable amount of dummy data before and a second variable amount of dummy data following the information in the block, while the sum of the first and second variable amount is substantially constant. The advantage of this is, that the total length of the information block will be substantially, constant allowing recording in a fixed location, while the information content is nevertheless recorded in randomly changing locations.

A further embodiment of the device according to the invention is characterized in that the mode of representation of recorded information comprises rotating the information over a randomly selected distance in the information block.

Information which extends beyond one side of the information block is added to the other side. This is advantageous in that no additional space on the disc is necessary for rotating the information. This is particularly advantageous when synchronization patterns are supplied which shift along with the information and are therefore not always located in the same position.

A further embodiment of the device according to the invention is characterized in that the mode of representation of recorded information comprises including the randomly selected distance in the respective information block. This is advantageous in that the distance of the rotation of the information can then be simply derived. This is particularly advantageous when synchronization patterns are used which shift along with the information, because in that case the amount of information before the first synchronization pattern and/or after the last synchronization pattern can be determined when read out.

These and other aspects of the invention will be apparent from and elucidated with reference to the embodiments described hereinafter.

BRIEF DESCRIPTION OF THE DRAWINGS

In the drawings 1 to 7:

FIG. 3 shows a device for recording and/or reading the information carrier, FIG. 4 gives a diagrammatic representation of a part of the track in which information blocks are recorded, FIG. 5 gives a diagrammatic representation of an adaptation procedure, FIG. 6 gives a diagrammatic representation of information rotating in an information block and FIG. 7 gives a diagrammatic representation of information blocks including variable amounts of dummy data. In the drawing Figures, elements corresponding to elements already described have like reference characters.

DESCRIPTION OF THE PREFERRED EMBODIMENTS

Figures 1A, 1B:
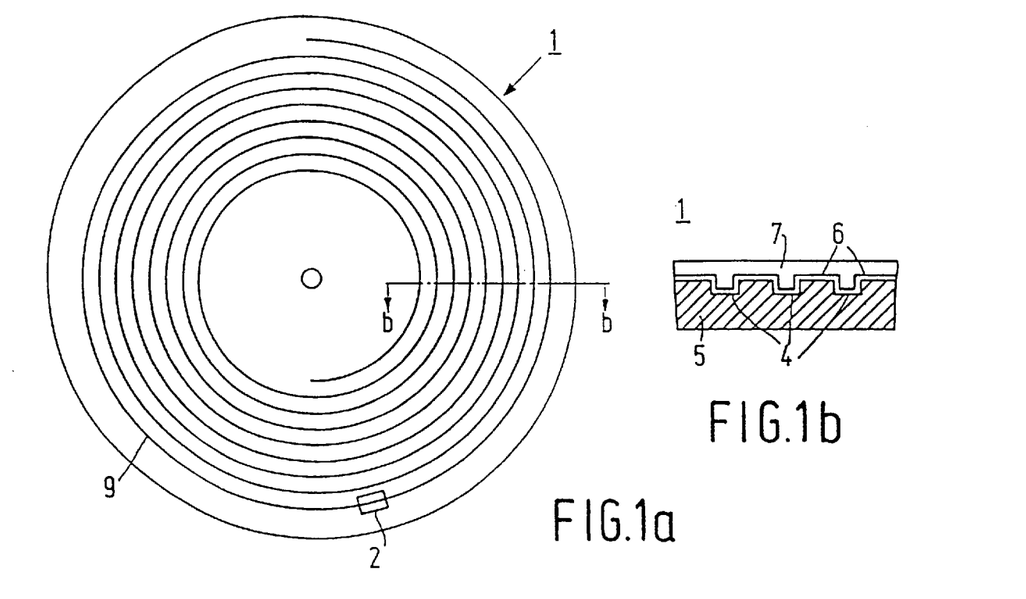
FIG. 1 shows an information carrier of a writable type.

FIG. 1a shows a disc-shaped information carrier 1 of a rewritable type. The information carrier includes a track 9 intended for recording, which track is arranged in a helical pattern of windings. The windings may also be arranged concentrically in lieu of helically. The track 9 is indicated on the information carrier by a servo pattern in which, for example, a pregroove 4 enables a read/write head to follow the track 9 during the scanning operation. The servo pattern may also includes, for example, regularly divided subpatterns which periodically cause signals to occur in a tracking servo. FIG. 1b shows a section along b—b of the information carrier 1, in which a substrate 5 is covered by a rewritable recording layer 6 and a transparent layer 7. The pregroove 4 may also be arranged as a raised part or as a material property different from its surroundings. The recording layer 6 may be recorded optically or magneto-optically by a device for recording information blocks. Information on the information carrier is represented by patterns of marks. in the track 9, each mark being is formed by one or more write pulse of a constant or variable write power which depends on, for example, the length of the mark. The write parameters, such as the write power, the number of pulses, the variation, the duty cycle etc. are to be attuned to the information carrier, whose material properties play a large role. An example of a writable information carrier is the CD erasable which is covered by a layer of phase-change material. A description of the reading of a CD and the use of a pregroove may be found in the title "Principles of Optical Disc Systems" by Bouwhuis et al., ISBN 0-85274-785-3.

Figure 1C:
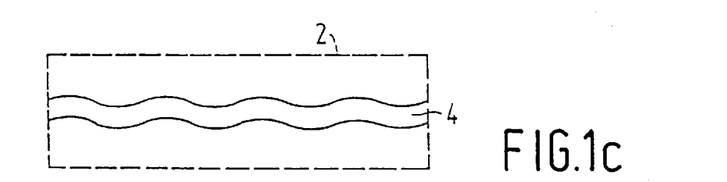
Figure 1D:
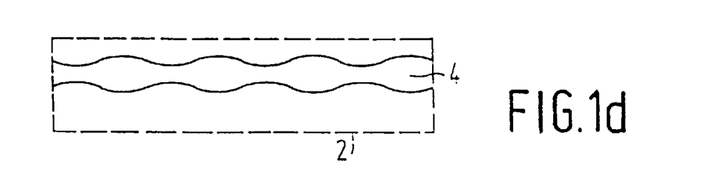

FIGS. 1c and 1d show two examples of a periodic modulation (wobble) of the pregroove. This wobble causes an extra signal to be developed in the tracking servo pick-up. The wobble is, for example, frequency modulated with an auxiliary signal which auxiliary signal contains encoded auxiliary information. The auxiliary information may be address information indicating position in the longitudinal direction along the track. A description of an information carrier containing such auxiliary information may be found in EP-0 397 238. The initial position in the track for writing information blocks may be derived from the address information on this information carrier.

The invention is likewise applicable to information carriers on which the position along the track is determined differently, such as, for example, via a separate reference pattern or via patterns previously recorded on the information carrier. The invention may also be applied to rewritable information carriers of another structure, such as, for example, an optical tape. These information carriers may be provided with address information in a different manner, for example, via information along an auxiliary track.

Figure 2:
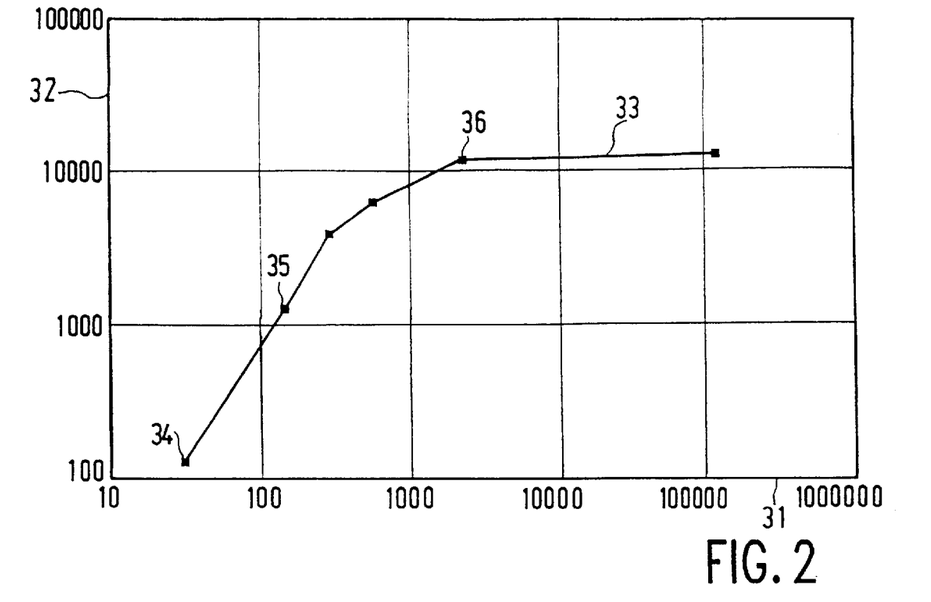
FIG. 2 shows a graph of the effect of recurrent recording versus shifting of the initial position.

FIG. 2 shows a graph of the effect of recurrent recording versus shifting of the initial position. The graph represents the situation in which always the same information block is recurrently recorded on a specific part of a rewritable information carrier. The information block is formed by optically readable marks of different lengths, for which the length differences are always a multiple of a fixed distance, a so-called channel bit. The quality of the read signal is always assessed, for example, on the basis of jitter or an eye pattern of the read signal. When recorded recurrently, the initial position of the information block in the longitudinal direction of the track is shifted each time over a random distance within specified boundaries. The number along the X-axis 31 denotes the distance between these boundaries in channel bits. Along the Y-axis 32 (logarithmically) is shown the number of times a specific part of a track has been recorded. A measuring point is found by recording until a specific degradation of quality occurs. In pulse position modulation (PPM) customary for known rewritable recording systems, only brief marks are recorded in a distributed manner. However when pulse length modulation (PLM) is used, which makes a higher information density possible, long marks often occur. An example of PLM with high information density is the EFM+ channel code described in PCT/IB95/00070, used in the high-density CD. Measurements have shown that an intensified version of the phenomenon occurs, if the patterns comprise stretched out, contiguously recorded marks. Furthermore, the phenomenon appears to occur especially if the frequency spectrum of the running average of the recorded patterns includes low-frequency components. The invention is therefore eminently suitable for use in combination with PLM. The curve 33 running through the measured points reflects a relation between the number of times a recording is made and the degree to which the recorded patterns are different each time they are repeated. This relation has surprisingly shown that the usable number of times a rerecording can be made diminishes if the same patterns are recurrently recorded on a (substantially) fixed position on the information carrier.

Furthermore, a considerable shift of the initial position is necessary for attaining the maximum attainable useful life. Contrary to expectations, a small shift of usable around 32 channelbits (first measurement value 34) did show a rather low number of rewrites. Such a shift, which is a few times the longest used mark in PLM, would distribute such long marks well beyond overlapping. In a practical example in CD-E having patterns of 17 channel bits for one information byte the longest mark is 11 channel bits. A shift of 2 information bytes, i.e. 34 channelbits, was expected to be sufficient. However only at a substantially larger shift of around 100 bits (second measurement value 35 at 128 bits) a considerable improvement was found. Beyond a shift of the order of 1000 channel bits (fifth measurement value 36) no further improvement was found for the measured information carrier.

Figure 3:
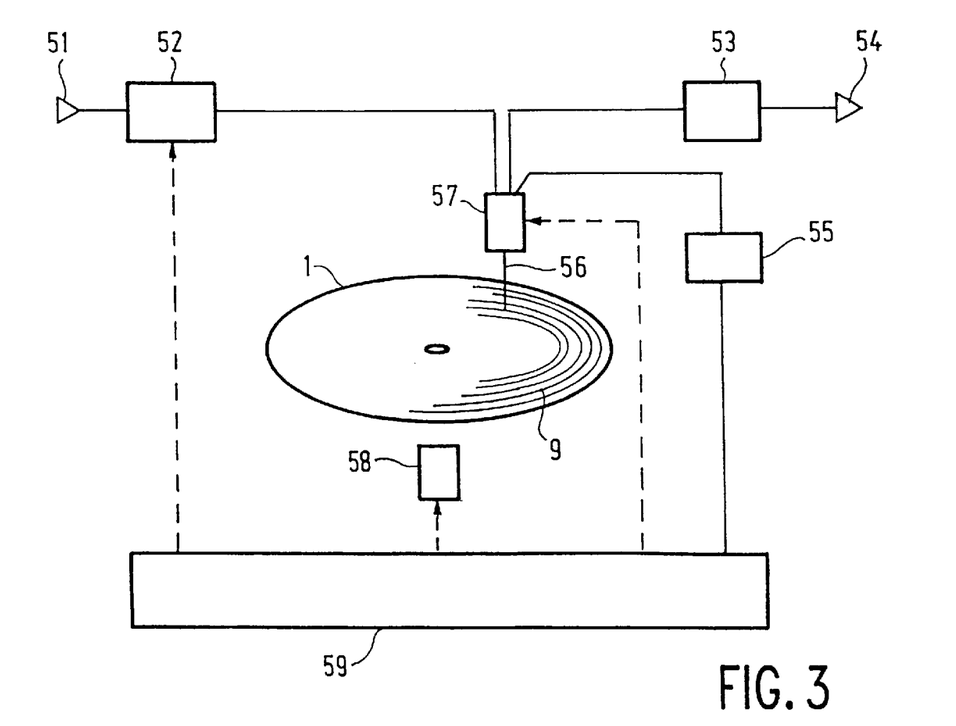

FIG. 3 shows a device according to the invention for reading and/or recording the disc-shaped information carrier. The device comprises coding means 52 and a read/write unit 57 for writing and/or reading information blocks on the information carrier 1. Information is applied to input 51 and converted into a write signal in coding means 52, the information being represented in the information blocks in a predefined manner. The write signal is applied to the read/write unit 57. The information carrier 1 rotates, driven by drive means 58. The read/write unit 57 scans via beam 56 the track 9 and writes patterns of marks in it which represent the information. During the scanning operation, the read/write unit 57 is positioned over track 9 by a servo system of a customary type (not shown). The system controller 59 controls the scanning of the information carrier 1 via the drive means 58 and the servo system. Generally, such a device will also comprise decoding means 53 for recovering the information from the patterns read out via the read/write unit 57. The recovered information is then produced on the output 54. A device for recording only may not include the decoding means 53 and output 54, while a device for reading only may not include the coding means 52 and input 51. The device further may include demodulator means 55 for recovering the address information. The servo signals generated while the track is being scanned, are applied to the demodulator means 55 which is arranged for demodulating the servo signals for recovering the auxiliary signal. The demodulator means 55 derives the address information from the auxiliary signal which information is passed on to the system controller 59.

According to the invention, the write means 52, 57, 59 are arranged for writing the information blocks in such a way that the writing of same patterns at the same position in a specific area of the track is minimized. A first measure to prevent this is that the system controller 59 shifts the initial position of an information block to be recorded always by a random distance relative to the nominally defined initial position. This distance is chosen at will but does lie within predefined boundaries, because otherwise it would be possible for preceding or succeeding information blocks in the track to be partly overwritten. Furthermore, it will be a large distance compared to pattern distances found in channel coding. With the respective rewritable information carrier, ample room should be left open between the blocks to make such a shift in position possible. This may be realized, for example, by reserving ample space for an information block and the maximum (peak-to-peak) shift between the nominal initial positions, for example, laid down in a standard system-specification. A shift by 1,000 bits may be taken as an example, which leads to a loss of information density of about 3% for the EFM+ code (8/16 data/channel bits) and a 2 kbyte information block and ID synchronization zones etc. and about 0.2% for a 32 kbyte information block. The effect of the first measure is further shown in FIG. 4.

A second measure according to the invention is the constant adaptation of the manner of representation of the information in the information blocks. For this purpose, the coding means 52 is arranged to provide a selected adaptation which is always different. A key which is indicative of the mode of representation, and which is therefore necessary for decoding the information block again when read out, is generated by the system controller 59. For example, a random byte creating 256 different keys may be used as a key. Alternatively, it is possible to use consecutive keys. They may then also function as a repetition counter, which shows by the key how often a part of the track has already been recorded. When a certain maximum is reached, that particular part of the track may then be blocked from further use, before errors will develop during reading. For generating the consecutive keys, a system may be used in which a large part of the bits between the consecutive keys is different. The key is stored either in the information block or somewhere else on the information carrier, for example, in a central region. In this respect it is important for the key to have maximum protection against errors during reading, since the information is no longer recoverable in the event of an incorrect key. For this purpose, the key may be protected by the customary errorcorrecting codes, but may also be repeated at several points in the information block. It is alternatively possible for the keys to be stored in a memory (for example, in the system controller) in the device. The memory may be a permanent memory; the information carrier can then only be read by the respective device. Alternatively, it is possible for the contents of the memory to be recorded on the information carrier at specific instants.

For adapting the manner of representation of the recorded information, scrambling may be used, for example. For such an adaptation, the write signal is processed in known fashion with a bit stream (for example, by an EX-OR operation). For generating the bit stream, use is made of a generator circuit in which the generated bit stream depends on the key. This key may be included in the information block, for example, in the ID. It is attractive for the ID to be recoverable in a simple manner from the read signal, since the ID should to be known rapidly to the system controller when a desired information block is to be jumped to. For this purpose, a simpler scrambling operation may be used for the ID. So-called self-synchronizing scramble operations may also be used for scrambling. This does not require any explicit key, but the descrambler will again be in line after a specific number of bits of a scrambled signal have been processed. It should be observed that when information is scrambled whose key is not changed for each writing operation, but is derived, for example, in information from the ID, the desired useful effect will not be achieved.

A further measure for adapting the manner of representation if the recorded information is the addition of an amount of dummy data to the information block, for example, by including a variable length zone filled with a randomly selected, but fixed dummy byte for each recording at the beginning of an information block. After this dummy zone then follows the ID zone which can be recognized in a fixed manner. As a result, the ID zone will always be found during the reading of the information block and still the whole track zone is recorded, so that no old or no longer valid parts of previously recorded information blocks continue to be present. Alternatively, at the end of the information block, such a zone with variable dummy data can be added while the length of the zone to be recorded (dummy zone +block contents +dummy zone) may then be constant. The manner of representation then comprises including a first variable amount of dummy data before and a second variable amount of dummy data following the information of the block, while the sum of the first and second variable amount is substantially constant.

Figure 7:
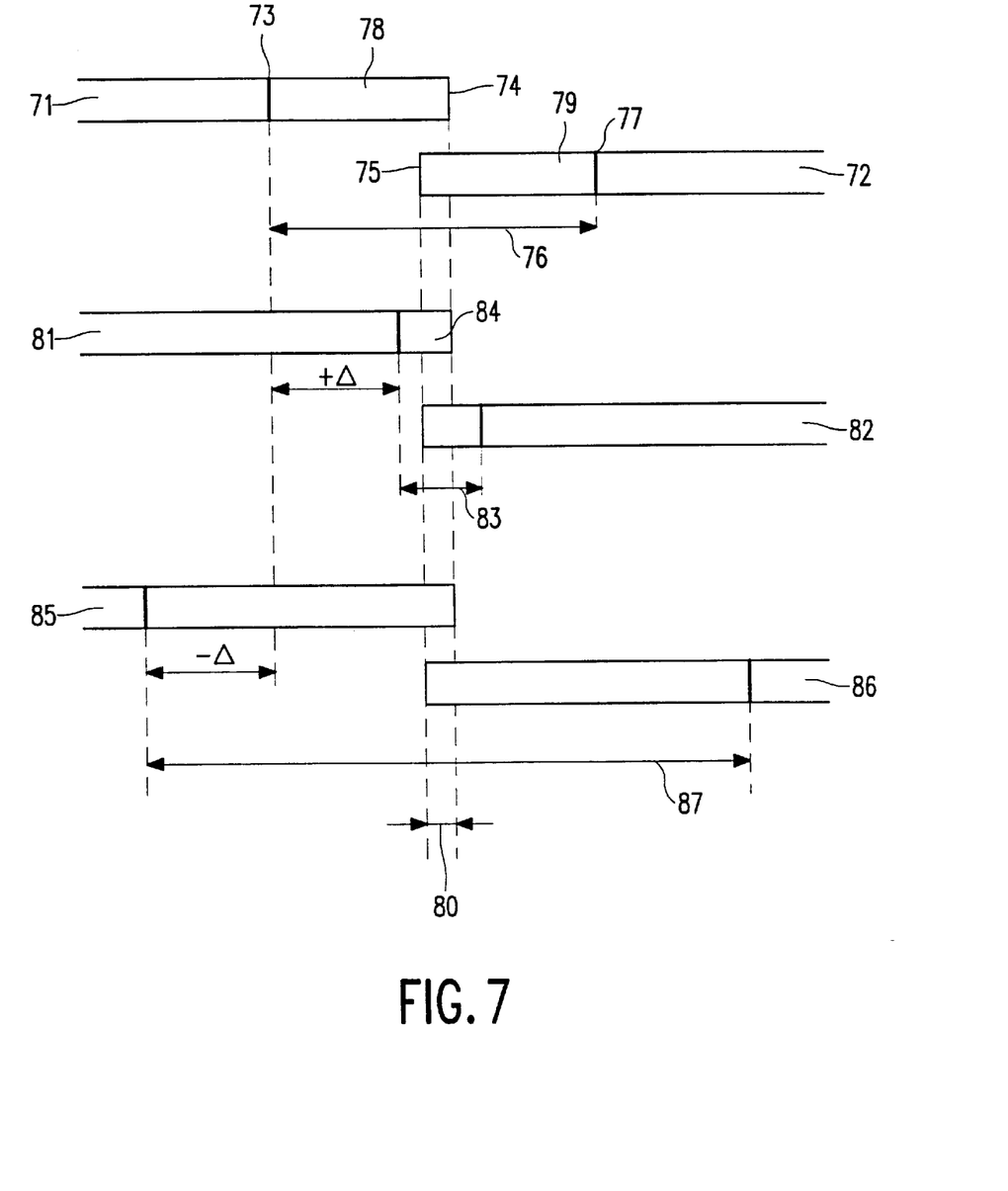

FIG. 7 schematically shows three possible situations between successive information blocks having dummy data included therein as described above. In the upper situation a first block 71 and a second block 72 are shown having a nominal (longitudinal) position of the information contents. When recorded in the track the blocks would be aligned laterally and therefor overlapping in a small margin 80. The overlapping area has the advantage, that the track will be recorded continuously also in the event of small positioning inaccuracies caused by actual timing errors. In a track uninterrupted recording marks prevent disturbance of servo systems and signal processing. The information content of the first block 71 ends with a synchronisation mark 73, as indicated by the thick line. After this synchronisation mark 73 an end link area 78 comprising dummy data follows until the physical end of recording 74. The second block 72 starts from a physical starting point 75 with start link area 79 comprising dummy data, followed by a synchronisation mark 77 and the information contents of the second block. The area between the last synchronisation mark 73 of the first block and the first synchronisation mark 77 of the second block is usually called a linking frame. Further linking frames may be present in the second block before the information contents to enable the signal processing of a reading device to adjust to the new block, which may have been recorded using slightly different parameters. The synchronisation marks preceding linking frames may have a special value indicating a linking frame. The linking frame between two successive information blocks has a nominal length 76, including the overlapping margin 80. In the middle situation two further successive blocks 81, 82 are shown having a shifted position of the information contents. The first block 81 has a large amount of dummy data at the beginning (not shown) and a complementary small amount 84 of dummy data at the end, resulting in the total length and the ending point of the first block 81 being equal to the upper situation, while the actual information contents have been shifted a distance $+\Delta$. The second block 82 in the middle situation has a minimal amount of dummy data at the beginning, so the linking frame 83 has the shortest possible length, while the information contents of the second block is shifted a distance $-\Delta$. The lower situation shows a first block 85 having a shift of $-\Delta$ and therefore a large amount of dummy data at the end. The second block 86 here has a shift of $+\Delta$, resulting in a maximum linking frame 87. The maximum shift should be sufficiently large as described above. In a practical example the frames between synchronisation marks could be 91 bytes, one byte being represented by 16 channel bits as in EFM+(see above). A shift of 62 bytes (992 bits) would result in a $\Delta$ of maximum 31. The end link area 78 of a linking frame is 49 bytes, while the start link area 79 is 50 bytes, and an overlapping area of 8 bytes allowing a jitter in the positioning of 4 bytes of both information blocks. This results in the lower situation in a maximum end link area of 49+31=80 bytes and a maximum start link area of 50+31=81 bytes and therefore in a maximum linking frame 87 of 80+81−8=153 bytes, which equals the nominal length augmented by the total shift 91+62=153. Correspondingly in the middle situation a minimum end link area of 49−31=18 bytes and a minimum start link area of 50−31=19 bytes result in a minimum linking frame 83 of 19+18−8=91−62=29 bytes. These limits of 153 and 29 bytes are the worst case situations above circumstances. It has to be noted, that one or more linking frames will be necessary in a practical system anyway for allowing the servo and signal processing electronics to adjust to the following information block, which very well may be written under different conditions in a different recorder from the previous block. So these frames can be useful for preparing reading or recording in a device. Applying the substantial shift according to the invention by adding dummy data as described here in combination with linking frames does not require any additional disk space, and so advantageously allows a high information density without loss of storage capacity.

The aforesaid two different measures may be implemented separately or in combination. An advantage of exclusively applying shift is that a reading device may not need to have specific measures for reading a rewritable information carrier recorded in accordance with the invention. For that matter, reading is then substantially the same as reading a Read-Only or Write-Once information carrier. This is an advantage for computer and multimedia applications in which information carriers of different types are used. If relatively small information blocks are recorded, the shifting may considerably the information density. In that case it is attractive, for example, to combine a limited shift with a scrambling operation. The scrambling strongly reduces the autocorrelation of the information block to be recorded. Depending on the selected channel code, certain patterns may continue to be fixed, for example, such as synchronization patterns in the EFM+ channel code. A limited shift operation will then be sufficient to record these patterns always at a different position on the track. By selecting a limited shift, it is naturally possible to achieve a higher information density on the information carrier.

According to the invention, the read means including the read/write unit 57 and the decoding means 53 as shown in FIG. 3 are arranged for reading the information blocks from positions substantially shifted over a distance arbitrarily chosen within predefined boundaries and/or for decoding the information blocks in accordance with the adapted manner of representation. The measures as described above for adapting the manner of representation are implemented in a complementary way in the decoding means, while the substantially shifted position and/or linking frames as described with FIG. 7 are handled by the read/write unit in combination with the servo system and the decoding means 53.

Figure 4:
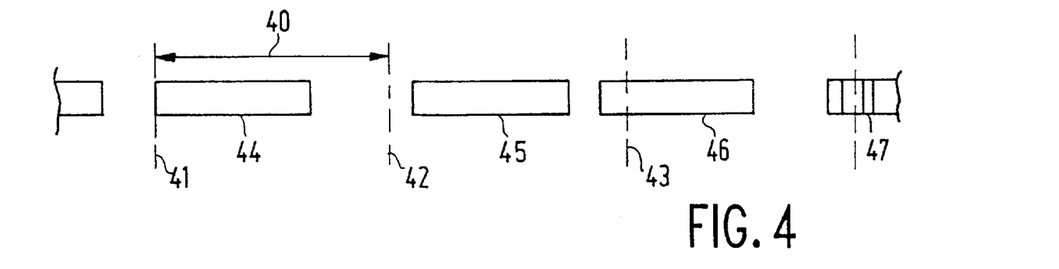

FIG. 4 gives a diagrammatic representation (and not to scale) of a track in which information blocks are recorded on shifted initial positions. The nominal initial positions are denoted by the dashed lines 41, 42 and 43. They are fixed mutual distances 40 apart. Furthermore, the system of shifting may also be applied to a subdivision of the track with different spacings between the nominal initial positions. The recorded information blocks are referenced 44, 45 and 46. There may be noticed that the first block 44 commences at the nominal initial position, the second block 45 at a specific distance after the nominal initial position and the third block 46 before the nominal initial position. The spacing between the blocks is therefore variable. After several recordings, the spacing will partly contain old information as is shown at the start of the last block 47. However, there should be observed that in known recording systems for writable information carriers some margin is given between the blocks for a variation of the initial position of an information block. This margin (for example, 16 bits) may be used to compensate for mechanical and electrical tolerances in the initial position, which occur when the recording operation is started. It has been found that such a margin is not sufficient to effectively counteract detonation, as described with FIG. 2.

Figure 5:
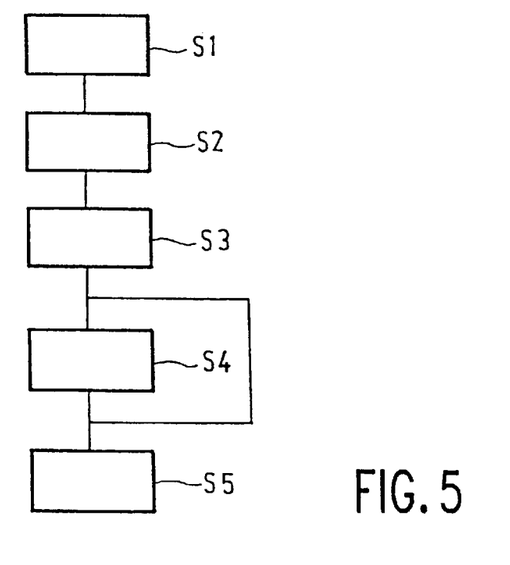

FIG. 5 gives a diagrammatic representation of an adaptation procedure. Two measures are combined for this purpose, scrambling and shifting. The system controller 59 carries out the following steps:

S1: the system controller receives the order for recording an information block and determines a nominal initial position.

S2: the system controller generates a random key and supplies same to the coding means 52 and orders the coding means to scramble with this key. The key itself, for example, is also included in the block.

S3: the system controller adds a random distance to the nominal initial position.

S4: the system controller positions the read/write unit 57 over the desired zone of the track 9 and waits for the computed initial position to be located under the read/write unit, for example in dependence of the address information read by the demodulator means 55.

S5: the system controller orders the write means 52, 57 to write. The reading operation (not shown) is carried out in similar manner, in which the key is first recovered from the read signal and applied to the descrambler means in the decoding means 53. Subsequently, the decoding is carried out as in known reading devices.

Figure 6:
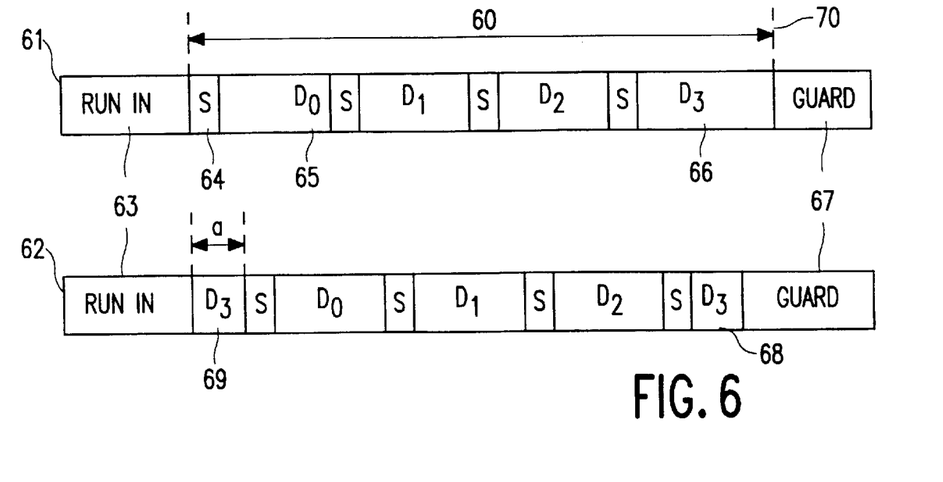

FIG. 6 gives a diagrammatic representation of rotating information in an information block. In a first information block 61 the information is placed in the nominal position. As is customary, the information block 61 starts with a RUN-IN part 63 which includes a run-in pattern for the reading means to run in, more particularly, for a Phase Locked Loop (PLL) to lock on to the regeneration of the data clock, and the information block is closed by a GUARD part 67 for avoiding an abrupt transition to an unrecorded part of the information carrier or patterns recorded previously. Between RUN-IN 63 and GUARD 67 there is located an information area 60 containing one or more data blocks Dn and synchronization patterns S; in FIG. 6 are shown 4 data blocks D0 (65), D1, D2 and D3 (66) and each data block is preceded by a synchronization pattern 64. To avoid data blocks and synchronization patterns S always being recorded in the same position when recorded recurrently, the information in the information area 60 is rotated by a random distance a each time it is recorded, as is shown in the second information block 62 in FIG. 6. Rotation, alternatively referenced wrap-around, is meant to be understood as the shifting of all the bits in the information area 60 in a particular direction, for which the bits that are shifted over the boundary of the data area are shifted to the vacant space on the other boundary of the information area. In the example of the information block shown 62, the data blocks and synchronization patterns are shifted over a channel bits and the information of the last data block D3 is split up into two parts 68, 69. The second part 69 of the last data block D3 would end up past the terminal boundary 70 after the shift and is added to the first data block after the initial boundary of the information area 60. Needless to observe that the rotation can also be effected in the other direction, while particularly D0 is split up into two parts. During the reading operation, the shift a is to be derived from the read signal, and the beginning and/or end of the information area 60 are to be derived too. This may be effected, for example, by choosing a specific format for the RUN-IN patterns and/or the GUARD patterns. Also the value of a can be explicitly included in the information block, preferably in a predefined position relative to the synchronization patterns. Preferably a variable pattern is used for the RUN-IN and/or GUARD part of the information block, because otherwise the quality of these parts will degrade faster than the parts of the data blocks. For example, by using the (variable) value of a in the RUN-IN pattern, the RUN-IN is variable and a can be recovered when read out. Alternatively, it is possible to vary only the position of the synchronization patterns by a and scramble the remaining data with a scramble key which is then included, for example, in the RUN-IN part. For reading blocks that display shifted synchronization patterns, the reading device preferably comprises a memory for storing the signal that precedes the first synchronization pattern, the contents of the memory being decoded after synchronization has been established. In the second information block 62 shown, the decoding may, for example, be effected, from the memory that stores the part 69 of the block which part is added to the first data block, subsequent to the decoding of the first part 68 of the last data block D3.

By selecting the distance a sufficiently large (of the order of 1000 channel bits, cf. FIG. 2), there is achieved that the rewritability for information blocks with synchronization patterns is high. This obviously holds likewise for information blocks without fixed synchronization patterns for which the synchronization of the decoding is effected differently when read out. It is also possible to use information blocks without a RUN-IN or GUARD area, for example, if a plurality of information blocks are recorded continuously. In all cases there is the advantage that rotation in this fashion does not ask for additional space between the information blocks, because they can always be recorded in the same positions.

What is claimed is:

1. Apparatus for programming a device for reading and/or writing an information carrier, comprising:

means for providing for recording an information block in a part of the track starting at a position displaced from a nominal initial position therein, the information block representing information in a predefined manner, and means for providing for regularly modifying the manner of representation of the information in an information block during successive rewrites thereof at least within a region extending approximately 32 times the bit length along the track from the nominal initial position thereof, in which modifying the manner of representation includes shifting the position of the beginning of the information in the information block a distance along the track at least 32 times the bit length with respect to the position of the beginning of the information in an information block during a previous write.

2. A device for reading an information carrier of a rewritable type having information recorded in a track thereof, the information being included in an information block and being in the form of data bits having a bit length, the block representing the information therein in a predetermined manner, the device comprising: reading means for reading and decoding the information block in a part of the track starting at an initial position thereon, the reading means being arranged for reading the information block in accordance with a varying manner of representation of the information therein within a region extending at least approximately 32 times the bit length along the track from the initial position, and for decoding the information block in accordance with the manner of representation;

and in which the manner of representation is recoverable from the information block when the block is read out.

3. A device for reading an information carrier of a rewritable type having information recorded in a track thereof, the information being included in an information block and being in the form of data bits having a bit length, the block representing the information therein in a predetermined manner, the device comprising: reading means for reading and decoding the information block in a part of the track starting at an initial position thereon, the reading means being arranged for reading the information block in accordance with a varying manner of representation of the information therein within a region extending at least approximately 32 times the bit length from the initial position, and for decoding the information block in accordance with the manner of representation;

and in which the manner of representation is modified by scrambling the information in the information block and by modifying the method of scrambling.

4. A device for reading an information carrier of a rewritable type having information recorded in a track thereof, the information being included in an information block and being in the form of data bits having a bit length, the block representing the information therein in a predetermined manner, the device comprising: reading means for reading and decoding the information block in a part of the track starting at an initial position thereon, the reading means being arranged for reading the information block in accordance with a varying manner of representation of the information therein within a region extending at least approximately 32 times the bit length along the track from the initial position, and for decoding the information block in accordance with the manner of representation;

and in which the manner of representation is modified by shifting the position of the information in the information block over a variably selected distance along the track in the block, the position of the information being shifted at least 32 times the bit length with respect to corresponding information previously stored in the block.

5. A device for recording an information carrier of a rewritable type, the information carrier including a track, the device comprising:

recording means for recording an information block starting at an initial position in a part of the track, the information block representing information in a predefined manner, the information being in the form of data bits having a bit length; and life extending means for modifying during successive rewrites the manner of representing the information within a region extending approximately 32 times the bit length from the initial position;

the manner of representing being modified in successive rewrites by shifting the position of the beginning of the information in the information block a distance along the track within the region by at least 32 times the bit length with respect to the position of the beginning of the information in previous writes.

6. A method of recording an information carrier of a rewritable type, the information carrier including a track, an information block being recorded starting at an initial position in a part of the track, the information block representing information therein in a predetermined manner and which is in the form of data bits having a bit length; the method comprising the step of modifying during successive rewrites the manner of representing the information in the block within a region exceeding approximately 32 times the bit length from the initial position, the modifying including shifting the position of the start of the information in the block substantially along the track within the region.

7. A method of recording an information carrier of a rewritable type, the information carrier including a track, an information block being recorded starting at an initial position in a part of the track, the information block representing information therein in a predetermined manner and which is in the form of data bits having a bit length; the method comprising the step of modifying during successive rewrites the manner of representing the information in the block within a region exceeding approximately 32 times the bit length from the initial position and the manner of representation is recoverable from the information block when the block is read out.

8. A method of recording an information carrier of a rewritable type, the information carrier including a track, an information block being recorded in a part of the track starting at an initial position thereon, the information block representing information therein in a predefined manner and which is in the form of data bits having a bit length; the method, comprising the step of modifying during successive rewrites the manner of representation of the information in the block within a region extending at least approximately 32 times the bit length from the initial position, the manner of representation is modified by scrambling the information in the information block and by modifying the method of scrambling.

9. A method of recording an information carrier of a rewritable type, the information carrier including a track, an information block being recorded in a part of the track starting at an initial position thereon, the information block representing information in a predetermined manner and which is in the form of data bits having a bit length; the method comprising the step of modifying during successive rewrites the manner of representing the information in the block at least within a region extending approximately 32 times the bit length from the initial position, the modifying of the manner of representation including shifting the position of the information in the information block over a variably selected distance along the track in the block, the position of the information being shifted at least 32 times the bit length with respect to corresponding information previously stored in the block.

10. A method of recording an information carrier of a rewritable type, the information carrier including a track, an information block being recorded starting at an initial position in a part of the track, the information block representing information therein in a predetermined manner and which is in the form of data bits having a bit length; the method comprising the step of modifying during successive rewrites the manner of representing the information in the block within a region exceeding approximately 32 times the bit length along the track from the initial position the modifying including providing a first variable amount of dummy data before and a second variable amount of dummy data after the information in the block, the sum of the first and second variable amount being substantially constant, the first amount of dummy data varying by at least 32 times the bit length from the first amount of dummy data in a previous write in the block.

11. A device for recording successive blocks of information on an information carrier of a rewritable type, the information carrier including a track, the information in each block being in the form of data bits having a bit length, each block representing the information therein in a predetermined manner; the device comprising:

recording means for recording, in successive write operations, an information block within a part of a track, each recording thereof starting at a position displaced from a nominal initial position of the block in the part of the track; and life extending means for modifying the manner of representation of the information in the block during successive write operations within a region extending at least approximately 32 times the bit length from the initial position for recording thereof in the write operations;

the manner of representation of the information in an information block being recoverable from the information block during read-out of the information therein.

12. A device for recording successive blocks of information on an information carrier of a rewritable type, the information carrier including a track, the information in each block being in the form of data bits having a bit length, each block representing the information therein in a predetermined manner; the device comprising:

recording means for recording, in successive write operations, an information block within a part of a track, each recording thereof starting at a position displaced from a nominal initial position of the block in the part of the track; and life extending means for modifying the manner of representation of the information in the block during successive write operations within a region extending at least approximately 32 times the bit length from the initial position for recording thereof in the write operations;

and in which the manner of representation is modified by scrambling the information in the information block and by modifying the method of scrambling.

13. A device for recording successive blocks of information on an information carrier of a rewritable type, the information carrier including a track, the information in each block being in the form of data bits having a bit length, each block representing the information therein in a predetermined manner; the device comprising:

recording means for recording, in successive write operations, an information block within a part of a track, each recording thereof starting at a position displaced from a nominal initial position of the block in the part of the track; and life extending means for modifying the manner of representation of the information in the block during successive write operations within a region extending at least approximately 32 times the bit length from the initial position for recording thereof in the write operations;

the manner of representation of the information in an information block being modified by shifting the information therein over a variably selected distance along the track in the successive write operations.

14. The device of claim 3, in which:

the manner of representation can be recovered from the information block when read out;

the manner of representation includes dummy data in the information block, which dummy data is recognizably when read out;

the manner of representation includes a first variable amount of dummy data before and a second variable amount of dummy data following the information of the block, while the sum of the first and second variable amount is substantially constant;

the manner of representation includes rotating the information over a variably selected distance in the information a block;

the manner of representation includes randomly selecting a distance in the respective information block;

the manner of representing the information is modified for every writing of the information in a portion of the track;

the initial position is shifted by a arbitrary amount within predefined boundaries;

the initial position is shifted within a region of the track with a length measuring at least approximately 100 times the bit length; and whereby the wear on the disk during writing is substantially reduce.

15. The device of claim 5, in which:

the manner of representation includes shifting the initial position;

the manner of representation includes shifting the beginning of the information of the information block with respect to the initial position;

the manner of representation can be recovered from the information block when read out;

the manner of representation includes scrambling with a scramble key which scramble key is included in the information block;

the manner of representation includes dummy data in the information block, which dummy data is recognizable when read out;

the manner of representation includes a first variable amount of dummy data before and a second variable amount of dummy data following the information of the block, while the sum of the first and second variable amount is substantially constant;

the manner of representation includes rotating the information over a variable selected distance in the information block;

the manner of representation includes randomly selecting a distance in the respective information block;

the manner of representing the information is modified for every writing of information in a portion of the track;

the initial position is shifted by an arbitrary amount within predefined boundaries; and the initial position is shifted within a region of the track with a length measuring at least approximately 100 times the bit length; and the wear on the disk during writing is substantially reduced by modifying the manner of representation of the information.

16. An information carrier of a rewritable type recorded in accordance with the method of claim 6.

17. The method of claim 6, in which:

the manner of representation is recoverable from the information block when read out;

the manner of representation includes scrambling with a scramble key which scramble key is included in the information block;

the manner of representation includes dummy data in the information block, which dummy data is recognizable when read out;

the manner of representation includes a first variable amount of dummy data before and a second variable amount of dummy data following the information of the block, while the sum of the first and second variable amount is substantially constant;

the manner of representation includes rotating the information over a variably selected distance in the information block;

the manner of representation includes randomly selecting a distance in the respective information block;

the manner of representing the information is modified for every writing of information in a portion of the track;

the initial position is shifted by an arbitrary amount within predefined boundaries; and the initial position is shifted or the manner of representation is modified for at least a distance of approximately 100 time the bit length; and the wear on the disk during writing is substantially reduced by the modifying of the manner of representation of the information.

18. An information carrier of a rewritable type recorded in accordance with the method of claim 7.

19. An information carrier of a rewritable type recorded in accordance with the method of claim 8.

20. An information carrier of a rewritable type recorded in accordance with the method of claim 9.

21. An information carrier of a rewritable type recorded in accordance with the method of claim 10.

22. The apparatus of claim 11, in which:

the apparatus consists essentially of one or more of: programmed computer media, a controller with means for communication with the device, and permanent memory;

the modifying of the manner of representation includes shifting the initial position of the information block substantially along the track within the region;

the initial position is shifted by a random amount;

the modifying of the manner of representation includes shifting the beginning of the information of the information block with respect to the initial position;

the manner of representation is modified in every subsequent write operation;

the manner of representation includes dummy data in the information block, which dummy data is recognizable when read out;

the manner of representation includes a first variable amount of dummy data before and a second variable amount of dummy data following the information of the block, while the sum of the first and second variable amount is substantially constant;

the manner of representation includes rotating the information over a variably selected distance in the information block;

the manner of representation includes randomly selecting a distance in the respective information block;

the manner of representing the information is modified for every writing of information in a portion of the track;

the initial position is shifted within a region of the track with a length measuring at least approximately 100 times the bit length;

and whereby the wear on the disk during writing is substantially reduced.

23. Apparatus for programming a device of claim 11 for reading and/or writing an information carrier, comprising:

means for providing for recording an information block in a part of the track extending from an initial position thereon, the information block representing information in a predetermined manner, and means for providing for regularly modifying the manner of representation of the information in the information block during successive rewrites thereof, the manner of representation being modified by scrambling the information in the information block and by modifying the manner of scrambling.

* * * * *